United States Patent

Garito

Patent Number: 5,940,567
Date of Patent: Aug. 17, 1999

[54] OPTICAL FIBERS HAVING AN INNER CORE AND AN OUTER CORE

[75] Inventor: Anthony F. Garito, Radnor, Pa.

[73] Assignee: Photon-X, Inc., Radnor, Pa.

[21] Appl. No.: 09/027,255

[22] Filed: Feb. 20, 1998

[51] Int. Cl.⁶ .................................................... G02B 6/02
[52] U.S. Cl. ........................................... 385/127; 385/124
[58] Field of Search .................................. 385/127, 122, 385/123, 124, 125, 126, 128

[56] References Cited

U.S. PATENT DOCUMENTS

| | | |
|---|---|---|
| 3,666,348 | 5/1972 | Marcatili . |
| 3,909,110 | 9/1975 | Marcuse . |

(List continued on next page.)

FOREIGN PATENT DOCUMENTS

| | | |
|---|---|---|
| 49-17246 | 2/1974 | Japan . |
| 52-58547 | 5/1977 | Japan . |
| 59-104104 | 7/1984 | Japan . |
| 60-200208 | 10/1985 | Japan . |
| 60-178804 | 11/1985 | Japan . |
| 62-52508 | 3/1987 | Japan . |
| 62-80607 | 4/1987 | Japan . |
| 62-79207 | 5/1987 | Japan . |
| 62-187305 | 8/1987 | Japan . |
| 62-291605 | 12/1987 | Japan . |
| 63-45511 | 3/1988 | Japan . |
| 63-208004 | 8/1988 | Japan . |
| 63-208005 | 8/1988 | Japan . |
| 63-222042 | 9/1988 | Japan . |
| 64-62603 | 3/1989 | Japan . |
| 1-169410 | 7/1989 | Japan . |
| 1-207705 | 8/1989 | Japan . |
| 1-224706 | 9/1989 | Japan . |
| 2-141704 | 5/1990 | Japan . |
| 3-44604 | 2/1991 | Japan . |
| 3-18161 | 3/1991 | Japan . |
| 3-127032 | 5/1991 | Japan . |
| 3-132726 | 6/1991 | Japan . |
| 3-229223 | 10/1991 | Japan . |
| 3-238883 | 10/1991 | Japan . |
| 4-24618 | 1/1992 | Japan . |
| 4-88306 | 3/1992 | Japan . |
| 4-104604 | 9/1992 | Japan . |
| 5-119222 | 5/1993 | Japan . |
| 5-155639 | 6/1993 | Japan . |
| 5-232337 | 9/1993 | Japan . |
| 5-323143 | 12/1993 | Japan . |
| 6-157064 | 6/1994 | Japan . |
| 6-235839 | 8/1994 | Japan . |
| 7-63940 | 3/1995 | Japan . |
| 7-211980 | 8/1995 | Japan . |
| 7-230015 | 8/1995 | Japan . |
| 7-43694 | 9/1995 | Japan . |
| 8-5855 | 1/1996 | Japan . |
| 8-43663 | 2/1996 | Japan . |
| 8-160241 | 6/1996 | Japan . |
| 8-234036 | 9/1996 | Japan . |
| 8-248250 | 9/1996 | Japan . |
| 8-304655 | 11/1996 | Japan . |
| 8-313750 | 11/1996 | Japan . |
| 9-159856 | 6/1997 | Japan . |
| 9-171116 | 6/1997 | Japan . |
| 9-171117 | 6/1997 | Japan . |
| 9-171119 | 6/1997 | Japan . |
| 9-211249 | 8/1997 | Japan . |
| 9-218318 | 8/1997 | Japan . |
| 9-258054 | 10/1997 | Japan . |
| 9-269432 | 10/1997 | Japan . |
| 9-288220 | 11/1997 | Japan . |
| 9-311239 | 12/1997 | Japan . |
| 9-311241 | 12/1997 | Japan . |
| 10-10350 | 1/1998 | Japan . |
| 10-39156 | 2/1998 | Japan . |
| 10-78524 | 3/1998 | Japan . |
| 10-79543 | 3/1998 | Japan . |

*Primary Examiner*—Phan Palmer
*Attorney, Agent, or Firm*—Finnegan, Henderson, Farabow, Garrett & Dunner, L.L.P.

[57] ABSTRACT

A multimode optical fiber includes an inner core and an outer core on the inner core having different refractive index profiles. The refractive index profile of the outer core is graded, while the refractive index profile of the inner core may be graded. The refractive index profiles have the same value at the inner core—outer core boundary.

50 Claims, 4 Drawing Sheets

U.S. PATENT DOCUMENTS

| | | |
|---|---|---|
| 4,076,378 | 2/1978 | Cole . |
| 4,236,786 | 12/1980 | Keck . |
| 4,436,368 | 3/1984 | Keck . |
| 4,516,826 | 5/1985 | Paek . |
| 4,755,022 | 7/1988 | Ohashi et al. . |
| 4,822,399 | 4/1989 | Kanamori et al. . |
| 4,953,947 | 9/1990 | Bhagavatula . |
| 5,054,018 | 10/1991 | Tremblay ................. 359/114 |
| 5,235,660 | 8/1993 | Perry et al. ............. 385/124 |
| 5,278,931 | 1/1994 | Antos et al. ............. 385/126 |
| 5,483,612 | 1/1996 | Gallagher et al. ....... 385/127 |
| 5,504,829 | 4/1996 | Evans et al. ............. 385/123 |
| 5,559,921 | 9/1996 | Terasawa et al. ........ 385/124 |
| 5,568,583 | 10/1996 | Akasaka et al. ......... 385/123 |
| 5,613,027 | 3/1997 | Bhagavatula ............ 385/123 |
| 5,659,649 | 8/1997 | Nouchi et al. ........... 385/124 |
| 5,668,659 | 9/1997 | Sakamoto et al. ....... 359/341 |
| 5,675,688 | 10/1997 | Nouchi et al. ........... 385/124 |
| 5,683,486 | 11/1997 | Oyamada et al. ........ 65/377 |
| 5,721,800 | 2/1998 | Kato et al. ............... 385/127 |
| 5,729,645 | 3/1998 | Garito et al. ............ 385/127 |
| 5,748,824 | 5/1998 | Smith ....................... 385/124 |

5,940,567

OPTICAL FIBERS HAVING AN INNER CORE AND AN OUTER CORE

BACKGROUND OF THE INVENTION

1. Field of the Invention

The present invention is directed to optical fibers for transmitting optical signals and, more particularly, to improved multimode optical fibers that possess unique refractive index profiles. Optical fibers according to the invention possess high bandwidth and high numerical aperture at multiple wavelengths while favorably accounting for material dispersion effects.

2. Description of the Related Art

There are major needs for high bandwidth, high numerical aperture optical fibers for applications in short and medium distance fiber optic communications network systems. Bandwidth is the amount of information that can be transmitted in a specified time interval and is among the most important characteristic features of an optical fiber link. The current ever-growing demand for high bandwidth is for voice, video, and data transmission in short and medium distance applications such as local area networks (LANs) and metropolitan area networks (MANs). In particular, current high data rate network forms, such as asynchronous transfer mode (ATM) and Ethernet, operate at several hundred megahertz (MHz) with bandwidths of 1000 MHZ (1 gigahertz (GHz)) and greater already planned for implementation.

Step index fibers according to the prior art are characterized by a single core region having a uniform refractive index, surrounded by a cladding layer having a lower refractive index. Graded index fibers according to the prior art are characterized by a single core region having a continuously varying refractive index from a higher value at the center of the fiber to a lower value at the core-cladding boundary. The graded core region is also surrounded by a cladding layer.

High numerical aperture multimode step index (SI) glass optical fiber can operate at data rates of 10–100 MHZ, but these lower rates are already approaching the physical bandwidth limits of the fiber. Standard single mode glass optical fiber can possess much higher bandwidth, as high as 5–10 GHz, but the prohibitive costs of splicing and connecting the several micron diameter fiber cores work against their wide spread use in LAN and MAN applications where multiple connections are required. Low numerical aperture, difficult to connect, multimode graded index (GI) glass optical fiber can also provide a higher bandwidth of approximately 1 GHz, but only at selected operating wavelengths. A multimode graded index glass optical fiber exhibits different bandwidth performance at different wavelengths due to the effect of material dispersion.

It is well established for optical fibers that fiber bandwidth performance is determined in large measure by the specific characteristics of the refractive index profile. In the presence of material dispersion, these index profile characteristics are different under different operating wavelengths. For example, it is desirable to operate silica based fibers at approximately 850, 1300, and 1550 nanometers (nm). Attempts to optimize bandwidth performance at multiple wavelengths have had limited success because of the complicated material compositions and fabrication conditions needed in forming graded refractive index profiles. It is well known that the precise control of the graded refractive index profiles required, for example, in presently available graded index glass optical fibers is a difficult and challenging task.

The above problems and shortcomings of graded index silica based, i.e., glass, optical fibers apply equally to graded index polymer optical fibers.

SUMMARY OF THE INVENTION

An object of the invention is to provide a high numerical aperture multimode optical fiber exhibiting high bandwidth performance.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, there is provided an optical fiber, comprising: an inner core having a first refractive index profile; an outer core on the inner core having a second refractive index profile which is lower than the first refractive index profile, wherein the first and second refractive index profiles have a comon value at an inner core-outer core boundary; and a cladding layer on the outer core.

Also in accordance with the present invention there is provided a method of making an optical fiber including an inner core having a first refractive index profile, an outer core on the inner core and having a second refractive index profile which is lower than the first refractive index profile, wherein the first and second refractive index profiles have a common value at an inner core-outer core boundary, and a cladding layer on the outer core, comprising: forming the inner core having the first refractive index profile; forming the outer core on the inner core fiber and having the second refractive index profile; and forming a cladding layer on the outer core.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

BRIEF DESCRIPTION OF THE DRAWINGS

Reference to the accompanying Figures provides further understanding by those skilled in the art of the numerous objects and advantages of the present invention, in which.

DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Improved high bandwidth performance, greater than 1 GHz, at multiple operating wavelengths is needed in high numerical aperture multimode fibers that account for material dispersion effects. The present invention addresses this important need.

The present invention provides improved multimode optical fibers having unique refractive index profiles that favorably account for material dispersion of the fiber. Multimode optical fibers according to the invention have high bandwidth performance, high numerical aperture, and operate at multiple wavelengths.

Numerical aperture is an important property of an optical fiber. Higher numerical aperture means greater acceptance angles for input light into the fiber. Thus, fiber-to-fiber splices exhibit lower loss, fiber-to-device coupling is more efficient, and fiber bending losses are lower.

Figure 1:
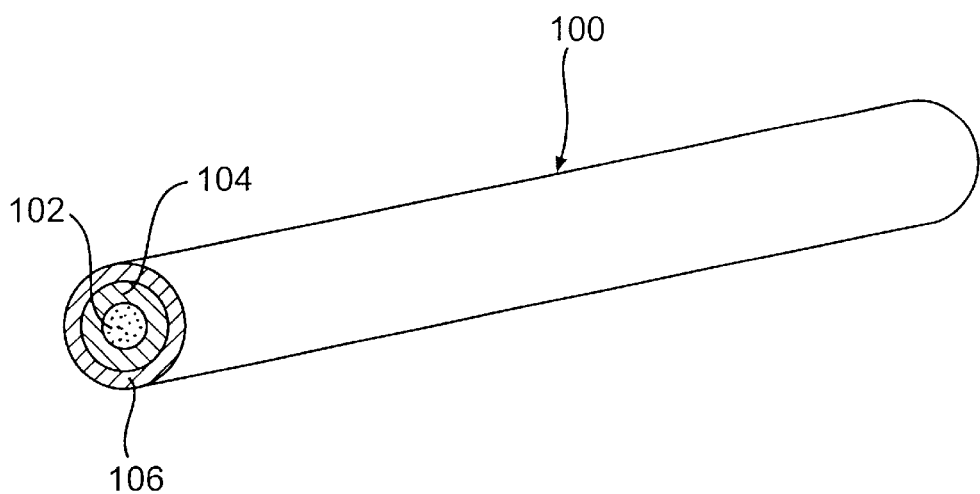
FIG. 1 is a perspective view of an optical fiber constructed according to the invention.

Optical fibers constructed in accordance with the present invention are inner core-outer core multimode optical fibers generally having the construction of an exemplary optical fiber 100 shown in FIG. 1. As seen in FIG. 1, optical fiber 100 includes an inner core region 102 surrounded by an outer core region 104. A cladding layer 106 surrounds outer core region 104 and is the outermost region of the optical fiber.

In various embodiments of the invention, the refractive index profile across inner core region 102 either remains essentially uniform, decreases from the center of optical fiber 100 following a straight line characteristic, or decreases with a curvilinear shape characterized as an alpha ($\alpha$)-profile, to the interface between inner core region 102 and outer core region 104.

The refractive index of outer core region 104 in preferred embodiments of the present invention follows a smooth and monotonic decrease with increasing fiber radius from the center of optical fiber 100. In selected embodiments, the refractive index profile of outer core region 104 either decreases with a straight line characteristic, or with a curvilinear shape characterized as an alpha ($\alpha$)-profile, to the interface between outer core region 104 and cladding layer 106.

Figure 2:
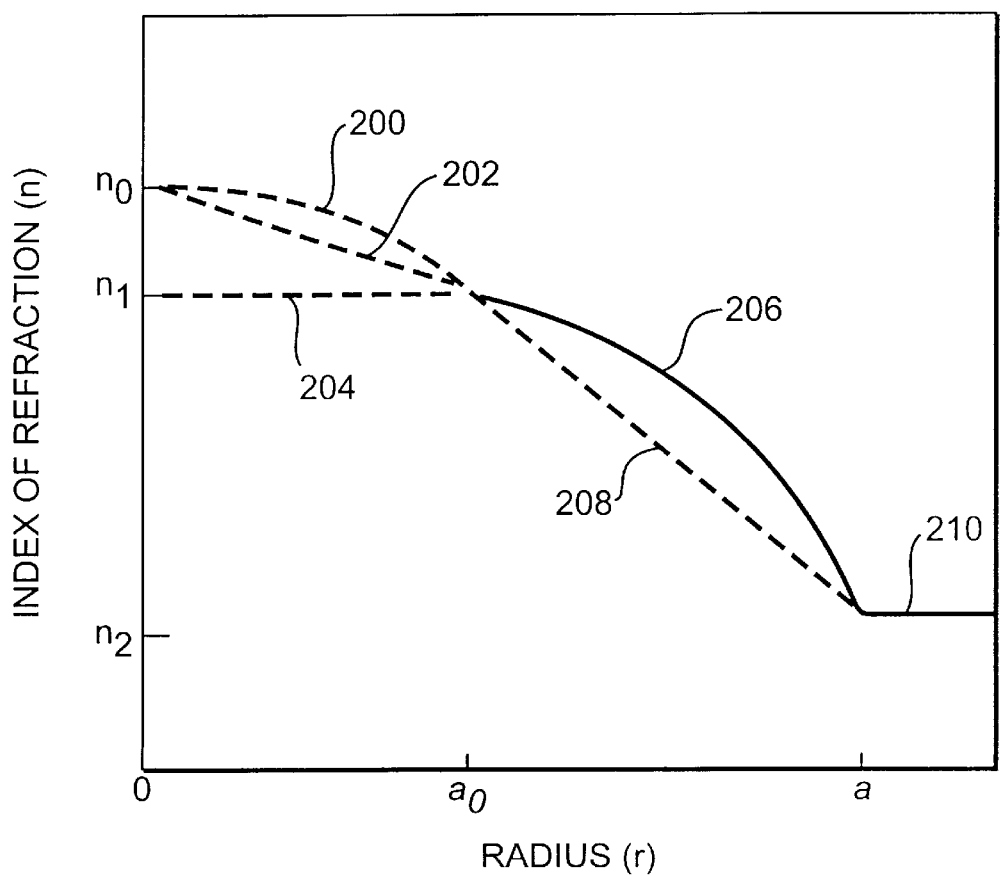
FIG. 2 is a graph of refractive index profiles according to embodiments of the invention.

FIG. 2 illustrates refractive index profiles of optical fibers according to embodiments of the present invention. More particularly, FIG. 2 is a graph of refractive index "n" versus optical fiber radius "r" according to various embodiments of the present invention. With reference to FIG. 2, the refractive index profile of inner core region 102 extends from the center of optical fiber 100 at radius r=0 to the boundary between inner core region 102 and outer core region 104 at radius r=$a_0$. In certain embodiments, the refractive index of inner core region 102 smoothly decreases from a value of $n_0$ at the center of optical fiber 100 (r=0) to a value of $n_1$ at the inner core-outer core boundary (r=$a_0$). This smooth decrease can have a curvilinear profile, such as curvilinear profile 200, or a linear profile such as a linear profile 202. In another embodiment, the refractive index of the inner core region is uniform, having a constant value of $n_1$ across the entire inner core region. In FIG. 2, linear profile 204 that is a horizontal line is an example of such a uniform refractive index.

The refractive index profile of outer core region 104 extends from the boundary between inner core region 102 and outer core region 104 at radius r=$a_0$ to the boundary between outer core region 104 and cladding layer 106 at radius r=a. In the outer core region of the profile, the refractive index follows a smooth and monotonic decrease from a value of $n_1$ at the inner core-outer core boundary to a value of $n_2$ at the outer core-cladding boundary (r=a). The general shape of the decreasing outer core refractive index profile is either curvilinear or linear in shape, as shown by profiles 206 and 208, respectively, in FIG. 2. The refractive index profile of cladding layer 106 is essentially uniform, as shown by profile 210 in FIG. 2 which is a horizontal line. As seen in FIG. 2, the refractive index of cladding layer 106 is equal to the lowest refractive index of outer core region 104.

It is intended that optical fibers can be constructed according to embodiments of the present invention utilizing all permutations of the inner and outer core region refractive index profiles described above and illustrated in FIG. 2. With respect to all of the possible permutations of inner core region and outer core region refractive index profiles, these profiles are continuous at the boundary between inner core region 102 and outer core region 104. The refractive index profiles of FIG. 2 are continuous at the inner core-outer core boundary in the following mathematical sense. If the profiles are expressed as a function n(r), then Lim n(r)=n($a_Q$, $a_Q$. That is, the graph in FIG. 2 exhibits no discontinuities (e.g., a step change in refractive index, where n($a_0$) would not exist) at the boundary between the inner and the outer core regions.

Each of the uniform and curvilinear inner core and outer core refractive index profiles, 200, 204, and 206 essentially follow an $\alpha$-profile characterized by the following equation (1):

$$n(r) \simeq n_i \left(1 - 2\left(\frac{n_i - n_j}{n_i}\right)\left(\frac{r}{r'}\right)^\alpha\right)^{1/2}; r < r' \qquad (1)$$

for any positive real number $\alpha$. The above equation for n(r) describes how the refractive index n varies as a function of fiber radius r. In the case when equation (1) describes inner core region 102, and with reference to FIG. 2, $n_i$ is either $n_0$ or $n_0$, depending on whether the index of the inner core region is graded or uniform, respectively; $n_j$=$n_1$; and r'=$a_0$. In the case when the profile of inner core region 102 has a uniform flat refractive index, $n_i$=$n_j$=$n_1$. In the case when the profile of inner core region 102 has a graded refractive index, $n_i$=$n_0$.

In the case where equation (1) describes outer core region 104, and with reference to FIG. 2, $n_i$=$n_1$; $n_j$=$n_2$; and r'=a.

In the case for outer core region 104, when index profile 208 is linear, then the refractive index has the following form:

$$n(r) = n_1 + (n_2 - n_1)\frac{r - a_0}{a - a_0}; a_0 < r \le a \qquad (2)$$

where $a_0$ is the radius of inner core region 102; a is the radius from the center of optical fiber 100 to the outer core-cladding boundary; $n_1$ is the refractive index at the inner core-outer core boundary; and n=$n_2$ at r=a, where $n_2$ is the refractive index of cladding layer 106, as shown in FIG. 2.

In other selected embodiments of the present invention, when the refractive index of outer core region 104 is extrapolated back over inner core region 102 to the center of optical fiber 100, the resulting extrapolated value is higher than the refractive index of inner core region 102. For example, with reference to FIG. 2, when section 206 is extrapolated back to r=0, its extrapolated portion has a higher refractive index than section 204 over the entire inner core region 102. Similarly, when section 208 is extrapolated back to r=0, its extrapolated portion has a higher refractive index than any of sections 200, 202, and 204, over the entire inner core region 102.

In an optical fiber, light is confined by bouncing back and forth between the core-cladding boundaries by total internal reflection. Such confinement is best described by guided modes. In a multimode fiber, different modes can be visualized as light traveling at different angles with respect to the longitudinal direction. Thus, in an optical signal transmission system, different transmitted modes will travel different distances from a transmitter before they reach a receiver and, therefore, arrive at different times. When used as transmission signals, very short optical pulses, after traveling some distance in such fiber, are broadened by modal and material dispersion effects. Such effects are a primary cause for the bandwidth limitation of the transmission system and an important subject for analysis and understanding.

In general, guided modes in an optical fiber are described by the following scalar wave equation (3):

$$\frac{1}{r}\frac{d}{dr}\left(r\frac{d\phi}{dr}\right) + \left(n^2 k_0^2 - \beta^2 - \frac{v^2}{r^2}\right)\phi = 0 \quad (3)$$

where $v$ is the azimuthal mode number of the mode, $\beta$ is the propagation constant of the mode, r is the radius of the fiber, $k_0$ is the free space wave vector, $\Phi$ is the field solution, and $n=n(r)$ is the refractive index of the fiber at radius r.

Equation (3) is solved by standard approximation methods, one of which is the WKB method. Thus, the value of propagation constant $\beta$ is obtained from the following WKB equation (4):

$$\mu\pi = \int_{a_1}^{a_2} \sqrt{n^2 k_0^2 - \beta^2 - \frac{v^2}{r^2}}\, dr \quad (4)$$

where $\mu$ is the radial mode number, and $a_1$ and $a_2$ are the positions where the integrand vanishes.

In the presence of material dispersion, the group delay time t is determined by $$t = -\frac{1}{c}\left(\frac{\partial m/\partial k_0}{\partial m/\partial \beta} + \frac{\partial m/\partial n_1}{\partial m/\partial \beta}\frac{dn_1}{dk_0} + \frac{\partial m/\partial n_2}{\partial m/\partial \beta}\frac{dn_2}{dk_0}\right) \quad (5)$$

where $n_1$ and $n_2$ are the refractive indices at the inner core-outer core boundary and of cladding layer 106, respectively, as shown in FIG. 2; m is the mode number, and c is the speed of light. The bandwidth of the fiber is obtained from the transfer function which is derived from the group delay time t.

The bandwidth and numerical aperture of a transmission medium define the performance limits and applications for which the medium is suitable. Along with outstanding bandwidth performance, the optical fibers of the present invention provide improved numerical apertures, especially as compared to low numerical aperture step index optical fibers and graded index optical fibers. Calculation of the coupling loss profile allows quantitative analysis of the fiber numerical aperture.

Figure 3:
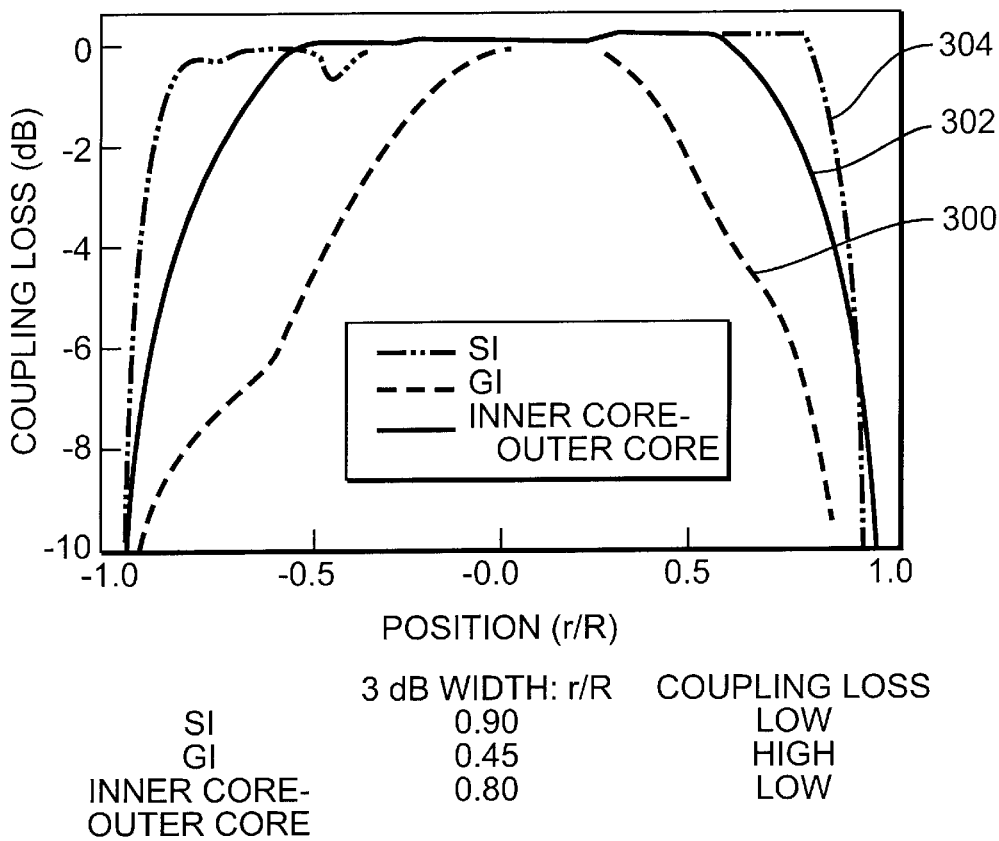
FIG. 3 is a graph and accompanying table showing coupling loss among step index, graded index, and inner core-outer core fibers.

Low fiber coupling loss for a given optical fiber geometry is a direct result of the fiber having a high numerical aperture, meaning a large acceptance angle. FIG. 3 is a graph comparing coupling loss results for step index and graded index profile fibers with those of an inner core-outer core design according to the invention, as in FIGS. 1 and 2. More particularly, FIG. 3 is a graph of coupling loss in decibels versus position within the core(s) represented as r/R, where r is a variable radius and R is the radius at the core-cladding boundary. For example R=a in FIG. 2. In FIG. 3, data plot 300 is a coupling loss of a graded index (GI) fiber, data plot 302 is a coupling loss of an inner core-outer core fiber according to the present invention, and data plot 304 is a coupling loss of a high numerical aperture step index (SI) fiber.

With reference to FIG. 3, the numerical aperture of a fiber constructed according to the invention is larger than that of a graded index fiber over the entire core radius, as illustrated by data plots 302 and 300, respectively, with the inner core region of the optical fiber according to the invention possessing the higher numerical aperture. Since numerical aperture is a measure of the acceptance angle over which light rays entering the fiber will be guided, a larger numerical aperture is preferred. The numerical aperture of the inner core-outer core profile 302 is much higher than that of low numerical aperture step index and graded index optical fibers and nearly matches that of a high numerical aperture step index optical fiber, such as shown in plot 304, resulting in easy fiber-to-fiber connections and much reduced coupling and bend loss.

In another embodiment, one or more of inner core region 102, outer core region 104, or cladding layer 106 includes glass. In certain embodiments, one or more of inner core region 102, outer core region 104, or the cladding layer 106 includes at least one organic polymer. In other embodiments, outer core region 104 includes a composition of at least two organic polymers having different refractive indexes. In other selected embodiments, inner core region 102 is glass, and outer core region 104 includes at least one organic polymer.

Those skilled in the fiber optic art will be able to construct the optical fibers herein disclosed using well-known materials and fabrication techniques without additional disclosure. Skilled practitioners will, for example, choose appropriate glass and polymer compounds to produce desired indices of refraction based on such design factors as, for example, length of the fiber, diameter, desired rigidity, cost, material availability, and present manufacturing capability. These materials are readily available in reference texts and patents, and the following specific materials are exemplary only.

A partial list of polymer compositions suitable for the cores and/or the cladding includes styrene acrylonitrile, fluoroalkyl methacrylate polymers, copolymers of methylmethacrylate and vinyl phenyl acetate (P(MMA-VPAc)) polyesters, acetonitrile butadiene styrene, polyolefins, polymethylmethacrylate, copolymers of methylmethacrylate and vinyl benzoate (P(MMA-VB)), copolymers of vinylidene fluoride and tetrafluorethylene, methyl methacrylate styrene, polystyrenes, polyesters, and polycarbonates. Further polymer compositions can be found in, for example, *Plastic Optical Fibers and Application*, Vol. 25, Information Gatekeepers, Boston Mass. 1994 ("Gatekeepers"); and L. Homak, *Polymer for Lightwave and Integrated Optics:*

Technology and Applications, Marcel Dekker, N.Y., 1992 ("Homak"). The above materials publications are all incorporated herein by reference.

Similarly, a partial list of suitable glass compositions includes those found in S. E. Miller and A. G. Chynoweth (eds.), *Optical Fiber Telecommunications*, Academic, N.Y., 1979 ("Miller I"); S. E. Miller and I. P. Karninow (eds.), *Optical Fiber Telecommunications II*, Academic Press, New York, N.Y., 1988 ("Miller II"); and Marvin J. Weber, *CRC Handbook of Laser Science and Technology: Optical Materials Part 3, Applications, Coatings, and Fabrication*, Vol. 5, CRC Press, 1987 ("Weber"). The above materials publications are all incorporated herein by reference.

Skilled practitioners also will, for example, choose appropriate manufacturing processes to produce the above desired materials based on such design factors as, for example, length of the fiber, diameter, desired rigidity, cost, material availability, and present manufacturing capability and expertise. These processes are readily available in reference texts and patents, and the following specific materials are exemplary only.

For graded index regions of polymer optical fibers, a partial list of suitable manufacturing processes includes, for example, centrifugal molding, photo locking, photo copolymerization, photo bleaching, multi-stage copolymerization, interfacial gel copolymerization, and polymerization initiator diffusion. Additional suitable manufacturing processes for polymer optical fibers, are disclosed in, for example, Homak; Gatekeepers; Emslie, *Review of Polymer Optical Fibers*, Journal of Material Science, Vol. 23 (1988); M. J. Bowden and S. R. Thunrer, *Polymers for High Technology*, American Chemical Society, Washington, 1987; U.S. Pat. No. 5,235,660; U.S. Pat. No. 5,555,525; and U.S. Pat. No. 5,593,621. The above manufacturing process publications are all incorporated herein by reference.

Similarly, for graded index regions of glass fibers, a partial list of suitable manufacturing processes includes, for example, standard melt drawing from a glass preform, inside and outside vapor deposition, extrusion, and sol-gel process. Additional suitable manufacturing processes for polymer optical fibers, are disclosed in, for example, Miller I, Miller II, Weber, U.S. Pat. No. 3,711,262, U.S. Pat. No. 4,062,665, and U.S. Pat. No. 5,522,003. The above manufacturing process publications are all incorporated herein by reference.

Thus, broadly, the present invention is also directed to a method for manufacturing an optical fiber comprising steps of forming an inner core with a first refractive index profile and forming an outer core surrounding the inner core and having a second refractive index profile. The method also includes a step of forming a cladding layer to surround the outer core. The first refractive index profile is established to be uniform across the inner core or to decrease from the center of the optical fiber with either a linear or curvilinear characteristic. The second refractive index profile is established to decrease from the inner core-outer core boundary with either a linear or curvilinear characteristic. Further, the first and second refractive index profiles are established such that they have a common value at the inner core-outer core boundary.

The invention will be fturther clarified by the following examples, which are intended to be purely exemplary of the invention, especially the specific wavelengths used. This invention is not limited to the specific wavelengths below, but instead may encompass the x-ray, ultraviolet, visible, near infrared, mid-infrared, and far infrared wavelength regions.

EXAMPLE 1

A general procedure for optical fibers enables calculation of group delay time as a function of mode number, taking explicitly into account material dispersion of the fiber in the limit of zero spectral source width and no mode coupling. The starting point is the WKB approximation relating the mode number m to the propagation constant $\beta$. In the presence of material dispersion, the group delay time t is determined by Equation (5) above.

The inner core-outer core refractive index profile consists of two regions, flat uniform inner-core region 204 and linear outer core region 208, as shown in FIG. 2, in the form of equation (6):

$$n(r) = \begin{cases} n_1 & \text{for } r \leq a_0, \\ n_1 + (n_2 - n_1)\dfrac{r - a_0}{a - a_0} & \text{for } a_0 \leq r \leq a, \\ n_2 & \text{for } r > a. \end{cases} \quad (6)$$

where $a_0$ is the inner-core radius and is given by $a_0 = a(0.5+q)$. Here q is a parameter dictating the inner core-outer core radius ratio. For example, q of zero indicates that the inner core occupies 50% of the overall core radius. In the limit when the inner core dimension $a_0$ is zero, the value of $q=-0.5$. The entire core region then consists solely of the outer core having a linear refractive index, and the core index profile is triangular in shape. In the opposite limit when $q=0.5$, the exemplary inner core-outer core index profile assumes the shape of a standard step index profile.

In the following numerical simulations, the inner core material is 13.5% molar $GeO_2$ and 86.5% molar $SiO_2$, and the outer core material is 0.1% molar $GeO_2$, 5.4% molar $B_2O_3$, and 94.5% molar $SiO_2$. There is a refractive index difference of 0.0206 at 850 nm between the core center and cladding. The refractive indices for the core center and cladding are 1.4737 and 1.4531, respectively, at 850 nm.

Figure 4:
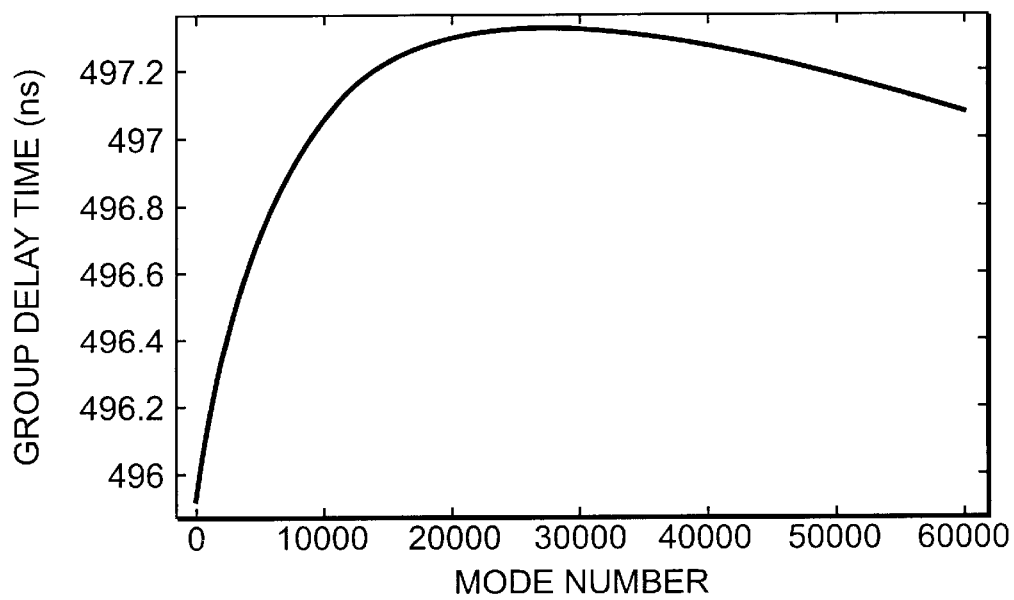
FIG. 4 is a graph of a group delay time dispersion spectrum for an outer core refractive index profile in a 100 m long fiber of Example 1.

FIG. 4 shows the group delay time t as a function of mode number m for $q=0$ at $\lambda=850$ nm. It is noted that although the group delay has significant spreading, the majority of modes are concentrated in a narrow region, indicating that the bandwidth should be reasonably high for the fiber. This observation is validated by the additional calculations in Examples 2 and 3.

EXAMPLE 2

Figure 5:
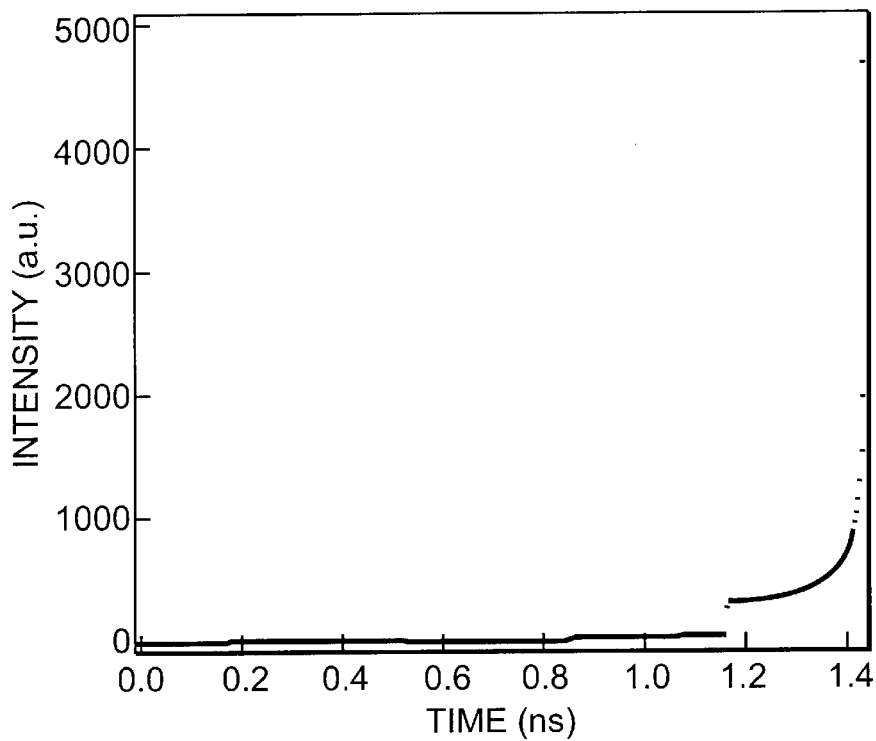
FIG. 5 is a graph of an impulse response function for an inner core-outer core refractive index profile in the fiber of Example 1.

The impulse response function, $h(t) |dm/dt|$, is determined from the group delay time as a function of mode number. FIG. 5 shows the impulse response function generated from FIG. 4 of Example 1 assuming equal modal power distribution among all guided modes. The discontinuity at about 1.16 ns in this particular example results from the non-monotonic behavior of the curve in FIG. 4. This impulse response in the time domain can be used, via a Fourier transform, to obtain the transfer function in the frequency domain.

EXAMPLE 3

Figure 6:
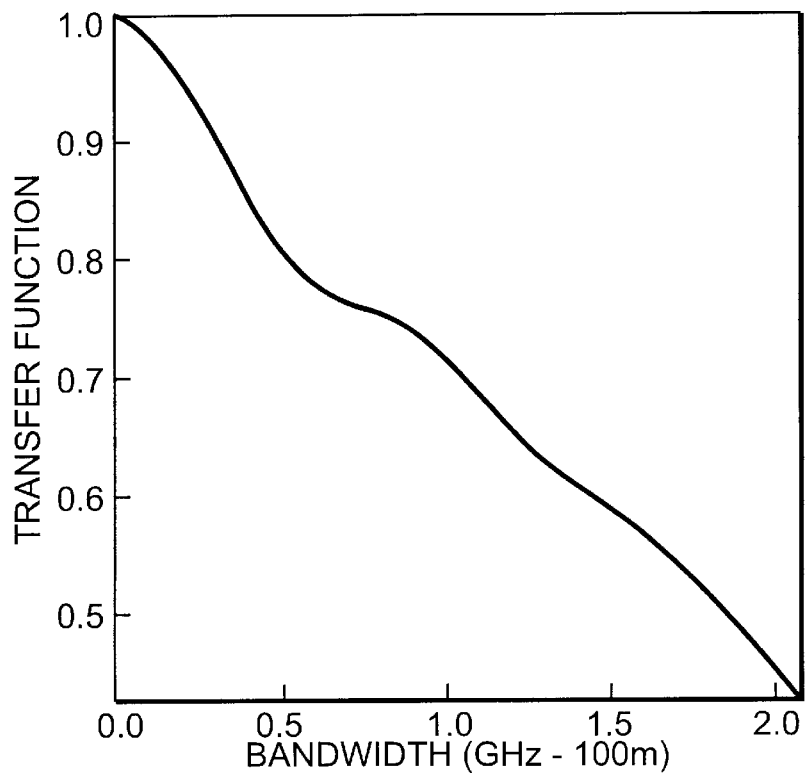
FIG. 6 is a graph of the transfer function for an inner core-outer core refractive index profile in the fiber of Example 1.

The transfer function is calculated in the frequency domain from the preceding impulse response function to obtain the bandwidth performance. FIG. 6 shows the transfer function generated from the data of FIGS. 4 and 5 of Examples 1 and 2. The 3 dB bandwidth at 850 nm, from the transfer function in FIG. 6, is determined to be 1.81 GHz for a 100 meter length of optical fiber. Similar calculations at 1300 nm produce a bandwidth of 3.46 GHz for a 100 meter length of optical fiber. There is a refractive index difference of 0.0209 at 1300 nm between the core center and cladding. The refractive indices for the core center and cladding are 1.4684 and 1.4475, respectively, at 1300 nm.

EXAMPLE 4

Figure 7:
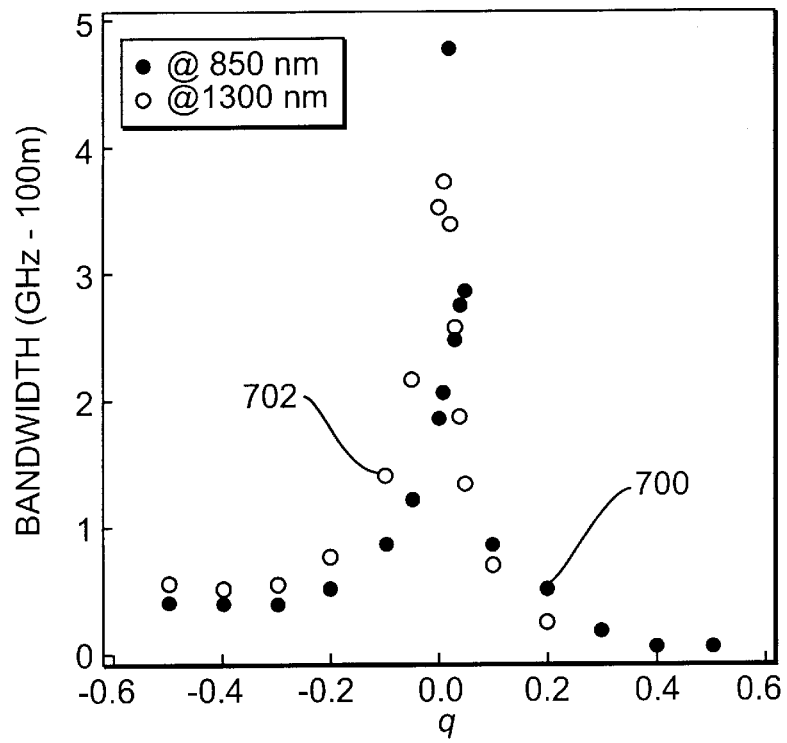
FIG. 7 is a graph of the bandwidth at 850 and 1300 nm as a function of q value for a fiber of Example 1.

Bandwidth calculations were carried out following the procedures of Examples 1–3 for different values of q for the $GeO_2$ doped silica fiber of Example 1. FIG. 7 shows the results at both wavelengths of 850 and 1300 nm in data plots 700 and 702, respectively. It is recognized that for $GeO_2$ doped silica when q=0.02, the bandwidth is optimized at both wavelengths, with bandwidths of 4.74 GHz for a 100 meter fiber length at a wavelength of 850 nm, and 3.35 GHz for a 100 meter fiber length at a wavelength of 1300 nm.

EXAMPLE 5

Figure 8:
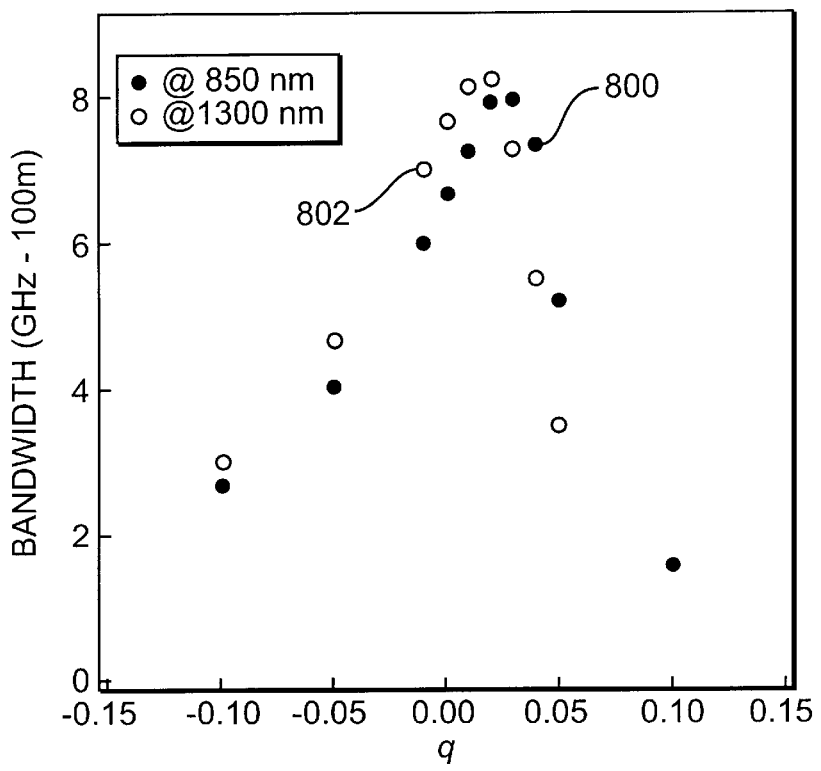
FIG. 8 is a graph of the bandwidth at 850 and 1300 nm as a function of q value for a fiber of Example 5.

Bandwidth calculations were carried out following the procedures of Examples 1–3 for different values of q for a $P_2O_5$ doped silica fiber having an inner core-outer core index profile the same as that of Example 1 (i.e., a flat uniform inner-core and a linearly decreasing outer core). The inner core region is composed of 10.5% molar $P_2O_5$ and 89.5% molar $SiO_2$ and the outer core region is composed of 13.5% molar $B_2O_3$ and 86.5% molar $SiO_2$. The refractive index difference between the core center and cladding is 0.0086 at 850 nm. The refractive indices for the core center and cladding are 1.4593 and 1.4507, respectively, at 850 nm. The refractive index difference between the core center and cladding is 0.0089 at 1300 nm. The refractive indices for the core center and cladding are 1.4537 and 1.4448, respectively, at 1300 nm. FIG. 8 shows the bandwidth as a function of q at both wavelengths of 850 and 1300 nm for such a fiber system in data plots 800 and 802 respectively. It is noted that when q=0.02, the bandwidth is optimized at both wavelengths, 7.86 GHz for a 100 meter fiber length at a wavelength of 850 nm, and 8.14 GHz for a 100 meter fiber length at a wavelength of 1300 nm.

EXAMPLE 6

Bandwidth calculations were carried out following the procedures of Examples 1–3 for an exemplary polymer optical fiber constructed in accordance with the present invention, at a wavelength of 650 nm which is centered at a major optical transmission window of a polymethylmethacrylate (PMMA) polymer. In this case, the refractive index of the inner core region of the fiber is flat and uniform, having a refractive index $n_1$=1.51, and the inner core region is composed of PMMA that is molecularly doped with benzyl benzoate (approximately 20% by weight) in order to raise the refractive index value above that of the host polymer PMMA. The cladding layer is composed essentially of PMMA having a refractive index of approximately 1.49. The refractive index of the outer core of the exemplary fiber has the linear form of Equation (2). For this example, q=0, meaning that the inner core radial thickness $a_0$ is equal to the radial thickness ($a-a_0$) of the outer core. The bandwidth is determined by standard WKB analysis of the group delay time as in Examples 1–3 above, and is found to be 1.0 GHz for a 100 meter polymer fiber length.

EXAMPLE 7

Bandwidth calculations were carried out following the procedures of Examples 1–3 for another exemplary polymer optical fiber constructed in accordance with the present invention at a wavelength of 650 nm, a major optical transmission wavelength of PMMA polymer. As in Example 6, the refractive index of the inner core region of the fiber is flat and uniform, having a refractive index $n_1$=1.51, and this inner core region is composed of PMMA that is molecularly doped with benzyl benzoate (approximately 20% by weight) in order to raise the refractive index value above that of the host PMMA. The cladding layer is composed essentially of PMMA having a refractive index of approximately 1.49. In contrast to Example 6, however, the refractive index of the outer core of the exemplary fiber follows the curvilinear form of Equation (1) with a=2. As in the Example 6, q=0, and the inner core occupies half of the overall core radius. The bandwidth is determined by standard analysis of the group delay time dispersion spectrum as in Examples 1–3 above and is found to be 2.0 GHz for a 100 meter polymer fiber length. The increase in bandwidth as compared to Example 6 reveals that, for a given inner core profile of the same dimension and polymer material composition, it is important to optimize the functional form of the refractive index profile of the outer core in order to achieve the maximum bandwidth performance. While an example varying q for a polymer fiber to optimize bandwidth at multiple wavelengths has not been shown, the above techniques and calculations in Example 5 shown for inner core-outer core glass optical fibers are equally applicable to inner core-outer core polymer optical fibers.

It will be apparent to those skilled in the art that various modifications and variations can be made in the multimode optical fiber of the present invention and its method of manufacture without departing from the scope or spirit of the invention. As an example, the fiber may carry light of different wavelengths than those specifically named above. While shown having a circular cross-section in FIG. 1, the optical fiber may have any one of a number of geometrical cross-sections, including square, rectangular, or hexagonal. Further the q values may be adjusted to optimize transmission at more wavelengths than in the two wavelength case illustrated in Examples 4 and 5. While Examples 1–7 concern either all-glass or all-polymer fibers, the present invention specifically contemplates and encompasses fibers which contain both glass and polymer materials. Finally, though the specification refers to optical fibers throughout, optical fibers are merely one class of optical waveguides, which are also contemplated and encompassed by this invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical fiber, comprising:

an inner core having a first refractive index profile;

an outer core on the inner core having a second refractive index profile which is lower than the first refractive index profile, wherein the first and second refractive index profiles have a comon value at an inner core-outer core boundary; and a cladding layer on the outer core.

2. The optical fiber of claim 1, wherein the first refractive index profile decreases with increasing radial distance from the center of the optical fiber.

3. The optical fiber of claim 2, wherein the first refractive index profile decreases in a linear manner.

4. The optical fiber of claim 2, wherein the first refractive index profile decreases in a curvilinear manner.

5. The optical fiber of claim 2, wherein the first refractive index profile decreases continuously and monotonically.

6. The optical fiber of claim 1, wherein the second refractive index profile decreases with increasing radial distance from the inner core.

7. The optical fiber of claims 6, wherein the second refractive index profile decreases in a linear manner.

8. The optical fiber of claim 6, wherein the second refractive index profile decreases in a curvilinear manner.

9. The optical fiber of claim 6, wherein the second refractive index profile decreases continuously and monotonically.

10. The optical fiber of claim 1, wherein at least one of the inner core, the outer core, and the cladding layer comprises an organic polymer.

11. The optical fiber of claim 10, wherein the outer core comprises a compound including a plurality of organic polymers having respectively different refractive indices.

12. The optical fiber of claim 10, wherein the inner core comprises glass and the outer core comprises an organic polymer.

13. The optical fiber of claim 1, wherein a radial thickness of the inner core is substantially equal to a radial thickness of the outer core.

14. The optical fiber of claim 1, wherein the first refractive index profile is uniform throughout the inner core.

15. The optical fiber of claim 1, wherein the first refractive index profile and the second refractive index profile are selected to maximize bandwidth for a selected wavelength.

16. The optical fiber of claim 1, wherein the first refractive index profile and the second refractive index profile are selected to optimize bandwidth for a plurality of wavelengths.

17. The optical fiber of claim 1, wherein at least one of the inner core, the outer core, and the cladding layer comprises glass.

18. A multimode optical fiber, comprising:

an inner core having a first refractive index profile;

outer core on the inner core having a second refractive index profile which is lower than the first refractive index profile and which decreases with increasing radial distance from the inner core, wherein the first and second refractive index profiles have a common value at an inner core-outer core boundary; and a cladding layer on the outer core, wherein the first refractive index profile and the second refractive index profile are selected to optimize bandwidth for a plurality of wavelengths.

19. The multimode optical fiber of claim 18, wherein a position of the inner core-outer core boundary relative to an outer core-cladding boundary is selected to further optimize bandwidth for a plurality of wavelengths.

20. A multimode optical fiber, comprising:

an inner core having a first refractive index profile;

an outer core on the inner core having a second refractive index profile which is lower than the first refractive index profile and which decreases with increasing radial distance from the inner core, wherein the first and second refractive index profiles have a common value at an inner core-outer core boundary; and a cladding layer on the outer core, wherein the first refractive index profile and the second refractive index profile are selected to maximize bandwidth for a selected wavelength.

21. The multimode optical fiber of claim 20, wherein a position of the inner core-outer core boundary relative to an outer core-cladding boundary is selected to further maximize bandwidth for a selected wavelength.

22. A multimode optical fiber for transmission of high bandwidth optical signals, comprising:

an inner core having a first refractive index profile;

an outer core on the inner core having a second refractive index profile which is lower than the first refractive index profile and which decreases with increasing radial distance from the inner core, wherein the first and second refractive index profiles have a common value at an inner core-outer core boundary of said multimode optical fiber and are selected for transmission of high bandwidth optical signals; and a cladding layer on the outer core.

23. The multimode optical fiber for transmission of high bandwidth optical signals of claim 22, wherein the bandwidth is at least 1 GHz for a 100 meter fiber length.

24. The multimode optical fiber for transmission of high bandwidth optical signals of claim 23, wherein the inner core includes a polymethylmethacrylate (PMMA) polymer doped with benzyl benzoate.

25. The multimode optical fiber for transmission of high bandwidth optical signals of claim 24, wherein a radial thickness of the inner core is substantially equal to a radial thickness of the outer core.

26. The multimode optical fiber for transmission of high bandwidth optical signals of claim 24, wherein the index of refraction of the inner core is 1.51 and the index of refraction of the cladding is 1.49.

27. The multimode optical fiber for transmission of high bandwidth optical signals of claim 23, wherein the inner core includes silicon dioxide doped with germanium dioxide.

28. The multimode optical fiber for transmission of high bandwidth optical signals of claim 26, Wherein the index of refraction of the inner core is 1.47 and the index of refraction of the cladding is 1.45.

29. The multimode optical fiber for transmission of high bandwidth optical signals of claim 22, wherein a radial thickness of the inner core is substantially equal to a radial thickness of the outer core.

30. The multimode optical fiber for transmission of high bandwidth optical signals of claim 22; wherein a radial thickness of the inner core is 52% of a radial distance from the center of the fiber to the cladding layer.

31. A method of making an optical fiber including an inner core having a first refractive index profile, an outer core on the inner core and having a second refractive index profile which is lower than the first refractive index profile, wherein the first and second refractive index profiles have a common value at an inner core-outer core boundary, and a cladding layer on the outer core, comprising:

forming the inner core having the first refractive index profile;

forming the outer core on the inner core fiber and having the second refractive index profile; and forming a cladding layer on the outer core.

32. The method of claims 31, wherein the inner core forming step includes a step of forming the inner core with the first refractive index profile decreasing with increasing radial distance from the center of the optical fiber.

33. The method of claim 32, wherein the inner core forming step includes a step of forming the inner core with the first refractive index profile decreasing in a linear manner.

34. The method of claim 32, wherein the inner core forming step includes a step of forming the inner core with the first refractive index profile decreasing in a curvilinear manner.

35. The method of claim 32, wherein the inner core forming step includes a step of forming the inner core with the first refractive index profile decreasing continuously and monotonically.

36. The method of claim 31, wherein the outer core forming step includes a step of forming the outer core with the second refractive index profile decreasing with increasing radial distance from the inner core.

37. The method of claim 36, wherein the outer core forming step includes a step of forming the outer core with the second refractive index profile decreasing in a curvilinear manner.

38. The method of claim 37, wherein the outer core forming step includes a step of forming the outer core with the second refractive index profile decreasing continuously and monotonically.

39. The method of claim 36, wherein the outer core forming step includes a step of forming the outer core with the second refractive index profile decreasing in a linear manner.

40. The method of claim 31, including the step of forming at least one of the inner core, the outer core, and the cladding layer to comprise glass.

41. The method of claim 40, including steps of forming the inner core to comprise glass and the outer core to comprise an organic polymer.

42. The method of claim 31, including the step of forming at least one of the inner core, the outer core, and the cladding layer to comprise an organic polymer.

43. The method of claim 42, including the step of forming the outer core to comprise a plurality of organic polymers having different refractive indices.

44. The method of claim 31, wherein at least one of the steps of forming the inner core, outer core, and cladding layer includes extruding.

45. The method of claim 31, wherein at least one of the steps of forming the inner core, outer core, and cladding layer includes drawing into a fiber of a predetermined diameter.

46. The method of claim 31, further including a step of cooling the fiber after the cladding layer forming step.

47. The method of claim 31, wherein the cladding layer forming step includes a step of forming the cladding layer with a refractive index that is equal to a lowest refractive index of the outer core.

48. The method of claim 31, wherein the inner core forming step includes a step of forming the inner core with the first refractive index profile uniform throughout.

49. The method of claim 31, wherein the inner core forming and outer core forming steps respectively includes steps of establishing the first refractive index profile and the second refractive index profile so that bandwidth is maximized for a selected wavelength.

50. The method of claim 31, wherein the inner core forming and outer core forming steps respectively includes steps of establishing the first refractive index profile and the second refractive index profile so that bandwidth is optimum for a plurality of wavelengths.

* * * * *